July 6, 1971  JEAN-MARIE LEROLLE ET AL  3,591,342
APPARATUS FOR THE PREPARATION OF NITRIC ACID
Original Filed Sept. 9, 1965  2 Sheets-Sheet 1

INVENTORS
JEAN-MARIE LEROLLE
SERGE HARDOUIN

Bauer and Seymour
ATTORNEYS

United States Patent Office 3,591,342
Patented July 6, 1971

3,591,342
APPARATUS FOR THE PREPARATION OF NITRIC ACID
Jean-Marie Lerolle, Paris, and Serge Hardouin, Lyon, France, assignors to Produits Chimiques Pechiney-Saint-Gobain, Paris, France, and Pintsch Bamag Aktiengesellschaft, Berlin, Germany
Original application Sept. 9, 1965, Ser. No. 486,058, now Patent No. 3,502,433, dated Mar. 24, 1970. Divided and this application Apr. 30, 1969, Ser. No. 820,569
Claims priority, application France, Sept. 10, 1964, 987,707
Int. Cl. C01b *21/28, 21/32*
U.S. Cl. 23—262                                     4 Claims

ABSTRACT OF THE DISCLOSURE

The oxidation of ammonia produces products which are cooled by the gaseous effluent of an absorption-oxidation tower, are suddenly chilled below the dew point, producing weak $HNO_3$ and NO, the NO is oxidized to $NO_2$ and medium $HNO_3$, the $NO_2$ is put into the base of the column, the medium $HNO_3$ is put into the column thereabove, and the weak $HNO_3$ is put into it at a higher level. The effluent used in cooling the products of ammonia oxidation drive a compressor which produces hot air to heat the ammonia, mixes with the concentrated $HNO_3$ from the tower to sweep out unabsorbed gases and coloring matter, and is injected into the oxidation of NO gas. The acid is over 70% $HNO_3$. The process uses all water formed by its reactions in the acid, adds only enough water to attain the selected concentration, discharges no water, operates at medium pressure of 3.5 to 4.5 atm. abs. The apparatus is novel.

---

Figure 1:
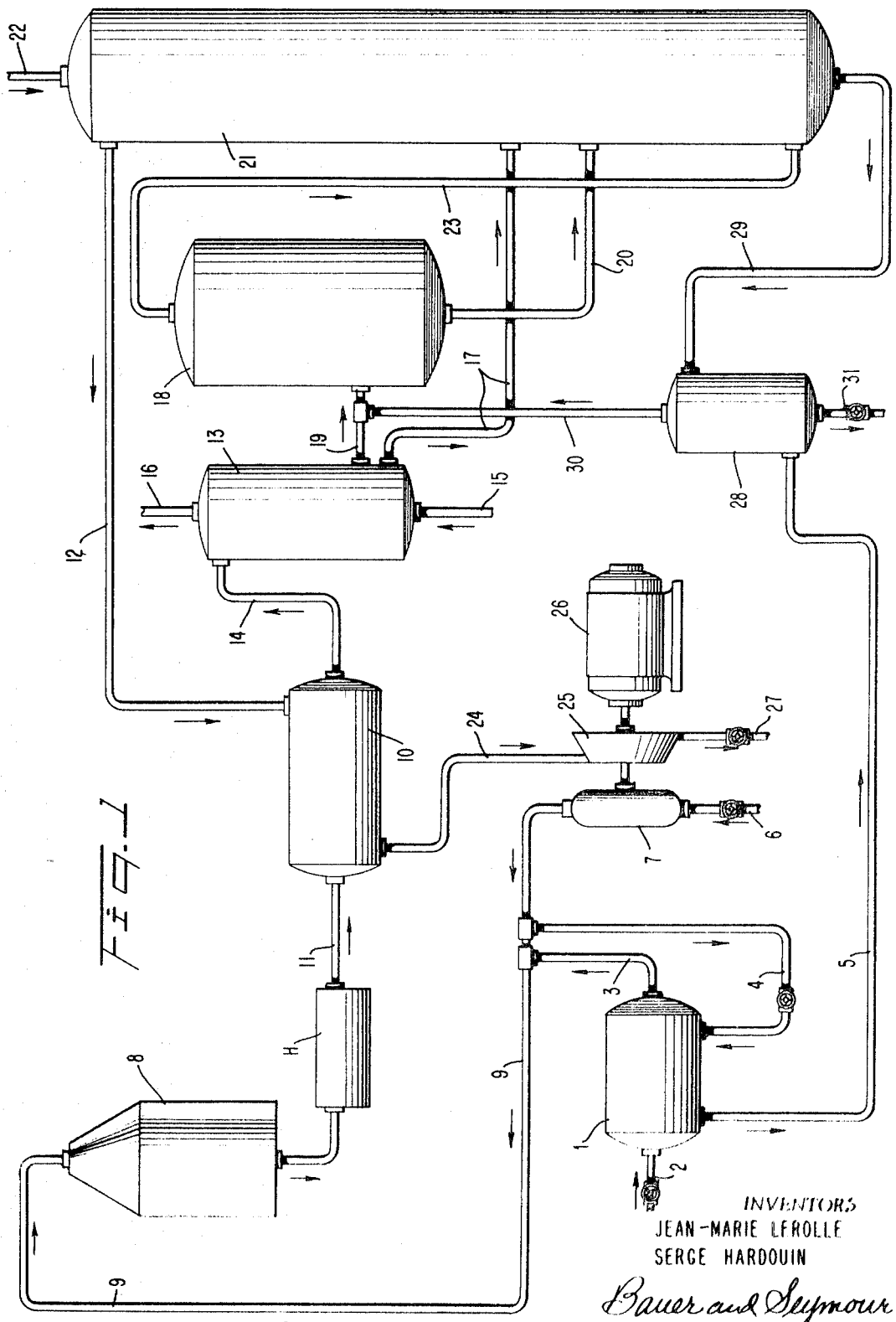

This application is a division of U.S. Ser. No. 486,058, filed Sept. 9, 1965 Pat. No. 3,502,433.

This invention relates to the preparation of nitric acid, particularly to the preparation of nitric acid of about 70% by weight or even high concentration. The process is an improvement in the known method of making nitric acid by burning ammonia in air.

Nitric acid of concentration approaching 60–62% has been produced from the combustion of ammonia in four successive steps. In the first step the ammonia was burned with air so as to form nitric oxide, NO, according to the reaction

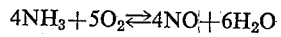

In a second step the products of combustion were cooled until the water condensed. This was carried on so as to eliminate a maximum of water. During this step $NO_2$ formed and reacted with water to make $HNO_3$. The combustion of the first step was carried out in the presence of an excess of air, in order that the excess should form nitrogen peroxide, $NO_2$, from nitric oxide. It was unavoidable that a part of the NO should be thus transformed to $NO_2$, which reacted with the condensed water to form a solution of nitric acid and had the disadvantage that the concentration of nitrogen oxides in the gas was reduced and the concentration of the nitric acid solution finally obtained was limited.

In the course of a third step the excess of air present in the gases oxidized the nitric oxide to nitrogen peroxide, an operation that has generally taken place in packed columns over the packing of which some nitric acid is circulated, serving as a liquid heat trap.

In a fourth step, the nitrogen peroxide reacted with water in liquid phase, to form nitric acid according to the reaction

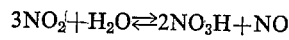

The nitric oxide thus formed was liberated and recycled through the system. These successive reactions of oxidation and absorption were carried out in an apparatus of multiple absorption columns.

In order to prepare more concentrated nitric acid investigators have tried to reduce the loss of nitrogen oxides during the second step by carrying out the combustion of ammonia and the refrigeration of the gases of combustion at a pressure as low as possible, usually at about atmospheric, so as to reduce the quantity of nitrogen oxide dissolved in the condensed water. This led to a difficulty, because it was necessary to oxidize and absorb the nitrogen oxides under pressure if commercial speeds of reaction and of absorption are to be obtained. Consequently, in that process, it was essential to compress the nitrogen oxides after the second, the cooling, step. This in turn required the use of a certain expensive-type compressor. When the oxides of nitrogen were compressed, they were reheated by the compression, which reduced the energy yield of the operation. It also required a new cooling after the compression. During the second cooling a new condensation took place which led to further losses of nitrogen oxides. The ammonia burners operated at pressures near atmospheric and were of necessity large and heavy, occupying excessive space, and being of lower productivity than burners acting under pressure, requiring several burners in a single apparatus.

It is an object of this invention to prepare nitric acid more efficiently than has been possible with the processes of the prior art, to prepare it in higher concentration, on the order of 70% by weight $HNO_3$ or higher, to prepare it with economic and technical efficiency, to reduce the size and cost of apparatus involved, to eliminate some of the steps of prior processes, and to carry out the entire operation at elevated pressure.

The objects of the invention are accomplished generally speaking by burning ammonia at a pressure of at least about 3.5 atm. abs., cooling the products of combustion to a point above the dew point, briefly and suddenly chilling the cooled products of combustion from above to below the dew point until about 75% of the water has been condensed, separating the gaseous products from the condensate and oxidizing them, and sending both fractions to an absorption tower, the entire process being accomplished without intermediate steps of compression.

The invention also relates to a thermodynamic system designed to produce maximum efficiency in the use of energy during the preparation of nitric acid.

The invention also includes novel apparatus which contributes to the accomplishment of the process and to thermodynamic efficiency.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

Figure 2:
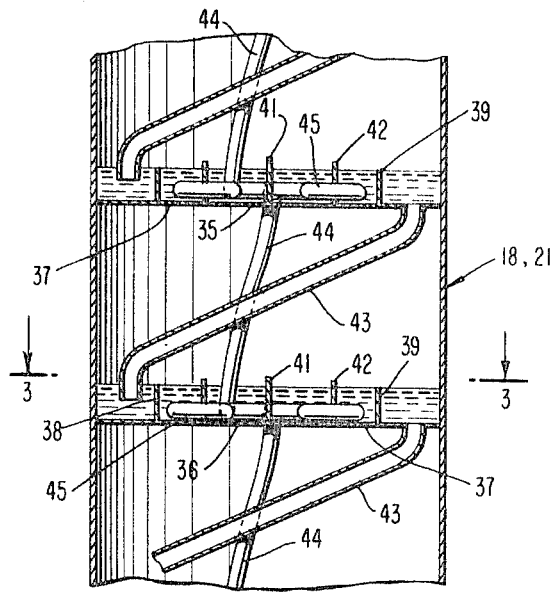
Figure 3:
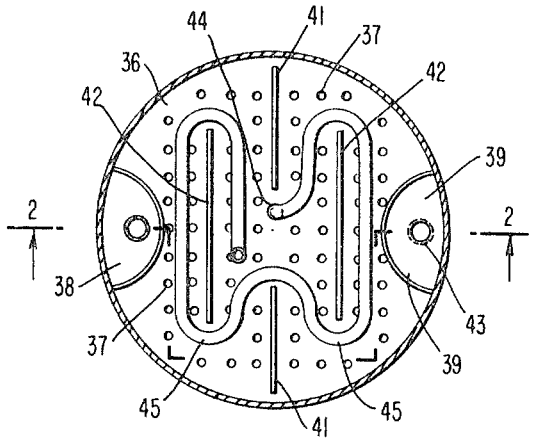

In the drawings, wherein like reference characters refer to like parts throughout the several views, FIG. 1 is a diagrammatic view of apparatus adapted to carry out the process;

FIG. 2 is a diagrammatic view in vertical, abbreviated section, of two plates of the absorption column, taken on section line 2—2 of FIG. 3; and FIG. 3 is a horizontal, diagrammatic section on line 3—3 of FIG. 2.

Air is admitted from source 6 to a compressor 7, being heated as it is compressed. Ammonia from a source not shown flows through a conduit 2 to an ammonia heater 1 and through conduit 3 to join and mingle with the hot air from the compressor, the mixture traveling through conduit 9 to the ammonia burner 8. For the purpose of this description this burner may be assumed to be of the platinum mesh type, operating at 4.5 atm. abs. pressure. Some of the air from the compressor 7 flows through a conduit 4 to a coil or other type heat exchanger in contact with the ammonia in heater 1, and this air flows thence through conduit 5 to a bleaching column 28 the function of which will be described hereinafter. The upper limits of pressure concern the safety of the apparatus, not the reaction.

The products of combustion from the burner 8 travel first to a heat or regenerator H in which the temperature of the gases is reduced from about 850° C. to about 260° C., which is the temperature at which it flows through the conduit 11 to a gas-gas indirect heat exchanger 10. In this heat exchanger it is further cooled, as will be hereinafter explained and then flows at about 160° C. through a conduit 14 to the top of a refrigerator-condenser 13 which is cooled by indirect heat exchange with a flow of water which enters through conduit 15 and leaves through conduit 16. In the refrigerator-condenser the gases are reduced from about 160° C. to about 60° C. in about 0.5 to 1 second, which is the duration of their residence in the refrigerator-condenser. Two products are formed in the refrigerator-condenser: 24% $HNO_3$, which flows through a conduit 17 to an intermediate stage of an absorption-oxidation column 21, and NO gas containing water, which passes through conduit 19 to oxidation column 18, being admixed on the way with gases from the bleaching column 28.

The oxidation column 18 may be of known type. In it the reaction $2NO+O_2$ takes place, producing $2NO_2$. The oxidized gases which do not contain $HNO_3$, pass through conduit 23 to the bottom of the column 21. The condensed water containing $HNO_3$, at about 63% concentration by weight, is admitted to the column through pipe 20. Water is admitted to the top of column 21 through conduit 22. The interior construction of the columns may be, as to its absorption-oxidation function, of known type, so far as this portion of the description is concerned. Concentrated $HNO_3$ issues from the bottom of the column and passes through conduit 29 to the bleaching column 28, from the bottom of which colorless $HNO_3$ emerges through conduit 31 at a concentration equal to or superior to 70% $HNO_3$. The bleaching column is of known construction. Its function is to sweep out any $NO_2$ which is dissolved in the $HNO_3$. For this purpose it uses air from the ammonia heater 1, which bubbles through through the $HNO_3$, strips it of $NO_2$ and of yellow color, and flows to oxidation column 18 through pipes 30–19, joining the gases from the refrigerator-condenser 13. A conduit 5 accepts the air which issues from the coil in the ammonia heater 1 and transfers it to the bleaching column 28.

From the top of column 21 gases pass through conduit 12 to the gas-gas heat exchanger 10 and thence through conduit 24 to turbine 25 where its energy combines with that supplied by electric motor 26 to drive the air compressor 7.

In FIGS. 2 and 3 are shown the essentials of a tower which is useful as the oxidation column 18 and as the absorption tower 21, being described as the latter. This tower has a cylinder 18, 21 and a multiplicity of horizontal plates 35, 36 which are perforated as at 37, and are provided with wells 38, 39 at opposite ends of a diameter. The condensate from the process collects on these plates, flows horizontally from wells 38 to wells 39 around baffles 42, 41, 42, and flows down from well 39 through conduit 43 to well 38 of the lower plate. As the liquid flows over the perforations it absorbs gases ascending through the tower and becomes progressively concentrated while the continuous condensation of water from the gases furnishes all the water that is needed for the formation of the acid.

Cooling water flows through lines 44 and serpentine cooling coils 45 which are immersed in the liquid on the plates. This water, being outside the pressure system, needs no pressure controls.

The flow of 63% acid through conduit 20 is admitted to one of the lower plates in the column through the side of the tower, and the 24% acid is similarly admitted, preferably at a higher level. The gases from the top of tower 18 are admitted below the plates of tower 21 and bubble upward through the flows of liquids on the plates.

The gas from the turbine, at a very low energy level, goes to exhaust 27. The entire system is maintained under a pressure of about 3.5 atm. abs. and preferably higher. After a first cooling of combustion gases to a temperature just above the dew point (the point at which drops of water form in the apparatus) the gas is suddenly and briefly chilled so that the water vapor which it contains is partially condensed. For this purpose a refrigerator-condenser is used in which the main residence of the gas is less than about 1 second and preferably less than about 0.5 second. About 75% or more of the water vapor in the gas is condensed in this step. Thereafter the oxides of nitrogen in the cooled gas are further oxidized and absorbed in an aqueous phase in a multiple stage absorber, the entire operation being carried out without an intermediate compression of the gas.

According to the invention the refrigerator-condenser is preferably of vertical, multi-tubular type through the tubes of which flows a refrigerating liquid, for instance water. The gas is introduced to this piece of apparatus at a temperature between about 100° and 200° C. and is discharged, partially dried, at a temperature about 40°–70° C., the nitrogen oxide content of this gas being close to that of its initial content. It is also preferred to oxidize the nitric oxide to nitrogen peroxide in a horizontal plate column. These plates are of perforated type having heat-exchanging walls, for instance serpentines submerged in the emulsion produced on the plates by the passage of gas. In the lower part of the column the gases which are still partially wet (being derived from the refrigerator-condenser) are circulated upward through the column. During that passage the water contained in the gas is condensed and absorbs the nitrogenous vapors of the liquid thus formed being sufficient to cover the plates and form an emulsion. The liquid which leaves each plate may be advantageously circulated by gravity to a lower plate, and it has been observed that the concentration of nitric acid which flows from plate to plate toward the bottom is such that it produces a partial release of nitrogen oxides and this partially compensates for the stripping of these gases and vapors by condensation.

The gases which have undergone a minimum stripping of nitrogen oxides leave the column both cooler and drier than they were when they entered and are directed toward the absorption column. It is observed that the capacity of the oxidation column may be reduced to $\frac{1}{5}$ or $\frac{1}{10}$ of the size of such columns as used in prior art for an equally satisfactory result. This is a surprising discovery, as the oxidation column 18 according to this invention acts with condensed water without additional $HNO_3$.

It is preferred to carry out the absorption-oxidation reaction in a column 21, which provides multi contacts between gas and liquids; for this purpose one or more plate columns can be used. In this operation as in that which has just been described the plates of the column may be provided with apertures or means such as slits or perforations which mingle the gases with the liquids. The feed zones have liquids on each plate and are approximately located along a line parallel to the outside of the column and near the periphery of the plate, the zones of discharge of the liquid on each plate being equally placed along a line parallel to the outside of the column but located near the edge opposite to that of the feed. The liquid runs from plate to plate downward through a conduit which directs the liquid transversely from one edge to the other of the receiving plate. The different plates may be provided with heat exchangers such as coils immersed in the emulsion which forms on the plates.

The process is carried out at substantially uniform pressure throughout the apparatus, although there is some loss of pressure between the burner and the absorber due to condensation and reduction in volume. The pressure is maintained in the whole apparatus at a minimum of about 3.5 atm. abs. In order to achieve this the ammonia is delivered to heater 1 at the chosen pressure, e.g. 4.5 atm. abs. The compressor 7 will be driven at a speed which generates an equal pressure in the conduits 9 and 4, and pipe 6 will have a check valve to retain the pressure should the compressor stop. The water flowing through the pipes 15, 16 and the water tubes of condenser 13 is outside the pressurized system and requires no pressure control. The turbine 25 maintains the selected pressure in the part of the system including the gas-gas heat exchanger 10 and the absorption column 21. A check valve in pipe 27 retains the pressure should the turbine stop. The water line 22 has an appropriately loaded valve which maintains a pressure of about 4.5 atm. in the column 21. The discharge pipe 31 has a valve loaded to about 4.5 atm. In order to prevent the building up of pressures to undesirable heights in the apparatus release valves may be located at satisfactory points where any released vapors will contain little obnoxious gas. A valve is located in air line 4 in order to control the amount of air which is directed to the heater 1 and to the bleaching column 28.

This apparatus normally produces nitric acid having a concentration about or superior to 70% by weight even though it uses simple apparatus of reduced size compared to that known to the prior art. The concentrated nitric acid thus produced is particularly useful in the manufacture of complex fertilizers and for the preparation of nitric acid of even higher concentration.

The following example illustrates the principle of the invention without detracting from its generality.

EXAMPLE 1

A platinum mesh burner 8 at 4.5 atm. abs. receives a mixture of ammonia and air containing 10% of $NH_3$ by volume. The gases leaving the burner at about 850° C. are cooled, with the recovery of energy, in a regenerator of heat from which they flow at 260° C., approximately, to a gas-gas heat exchanger which is at a temperature above the dew point and reduces that of the gases to about 160° C. The gases are then sent to the refrigerator condenser where they remain about ½ second, leaving at about 60° C. The conduit 17 discharges a solution of 24% nitric acid, which contains about 80% of the water formed by the combustion of ammonia and air, which absorbs only 10.5% of the NO from the combustion. The solution contains 24% by weight of $HNO_3$ and goes to the absorption-oxidation column 21.

For purposes of comparison a similar installation, equipped with a refrigerator-condenser of classical type, produces a condensate of 44% nitric acid, corresponding to 97% of the water and 30% of the nitrogen oxides formed in the combustion.

In the persent invention the gases issuing from the rerigerator-condenser are mixed with those coming from the bleaching column 28. This mixture contains about 200 g. of nitrogen oxide, expressed as NO, per cubic meter and it is introduced into the oxidation column 18. The gas dwells in this column about ⅕ of the time required in the classical basic column. From this column 18 there is a small discharge of 63% nitric acid which flows to the absorption tower 21. The gases leaving column 18 are introduced at the lower part of the absorption column. The gases which leave column 21 contain less than 0.1% (usually about 0.08%) of nitrogen oxide by volume. After bleaching in column 28 the nitric acid, colorless and of about 70% concentration, is discharged to a receiver column.

The reactions which occur are represented by the following equations:

(1) $4NH_3 + 5O_2 \rightarrow 4NO + 6H_2O$ (2) Cool product to temperature above and adjacent the dew point.

(3) Chill rapidly under dew point, condensing about 75% of $H_2O$ vapor (column 13).

Column 28

(4) $2NO + O_2 \rightarrow NO_2$ (4a) $3NO_2 + \text{remaining } 25\% \; H_2O \rightleftharpoons 2NO_3H + NO$ Column 21

(5) $3NO_2 + H_2O \rightarrow 2NO_3H + NO$ (5a) $NO + \frac{1}{2}O_2 \rightarrow NO_2$ The distinctive features of this process are numerous: The entire process is carried out under pressure above about 3.5 atm. abs.; the $HNO_3$ delivered is at a concentration of 70% by weight or more; intermediate compressions are eliminated; the thermodynamic efficiency of the process is very high, especially because of the linking of the absorption tower to the gas-gas exchanger and the turbine, and the linking of the hot air from the ammonia heater to the bleaching column and the oxidation column; the gases released from the absorption tower and the turbine are so low in obnoxious gases as to be releasable to the air; the handling of the gases at the dew point is unique and valuable both as to speed, efficiency, and ultimate result.

We claim:

1. An apparatus for the production of nitric acid comprising a source of ammonia, an ammonia heater, an air compressor, an ammonia burner, a heater exchanger, a refrigerator-condenser, an oxidation column, an absorption-oxidation column, a bleaching column, a turbine, conduits for feeding ammonia from the source through the ammonia heater to the ammonia burner, a conduit for passing the products of combustion from the ammonia burner to the heat exchanger, a conduit for passing the cooled products of combustion from the heat exchanger to the refrigerator-condenser, a conduit for passing the cooled products of combustion from the refrigerator-condenser to the oxidation column, a conduit for passing the oxidized gases from the oxidation column to the bottom of the absorption-oxidation column, a conduit to pass gases from the top of the absorption-oxidation column to the heat exchanger and to pass the gas in indirect heat exchange with the products of combustion, a conduit to pass the last mentioned gases through the turbine, conduits to pass air from the air compressor in part to the ammonia burner and in part to the ammonia heater, to pass in indirect heat exchange with the ammonia, and from the ammonia heater to the bleaching column, conduits to pass liquid nitric acid from the refrigerator-condenser and the oxidation column to intermediate points in absorption-oxidation column, a conduit to pass nitric acid from the bottom of the absorption-oxidation column to the bleaching column, a conduit for passing the air and nitrogen oxides from the bleaching column to the oxidation column.

2. In an apparatus according to claim 1 in which at least one of said oxidation column and absorption column comprises a vertical cylinder, a plurality of plates extending horizontally across the cylinder at spaced levels, each plate having wells at spaced points, conduits converying the liquid downward from plate to plate, cooling means engaging the flow of liquid on each plate, said plates having perforations between the wells for passage of gas.

3. In a system for forming nitric acid by the oxidation of ammonia, a closed system for maintaining the ammonia and gases at superatmospheric pressure and substantially constant pressure in the system and for the recovery of energy in the system, including an ammonia burner, air compressor and turbine, the improvements which comprise the combination of a heat exchanger to cool the products of combustion to the dew point, a refrigerator-condenser to rapidly condense the nitric acid from said cooled products of combustion, and oxidation column to oxidize the nitrogen oxide from the gases from the refrigerator-condenser and from the bleaching column, an absorption-oxidation column to recover the dissolved nitrogen oxides as nitric acid, a bleaching column to remove nitrogen oxides from the nitric acid and to decolor the acid, conduits to pass the products of combustion successively through the heat exchanger, the refrigerator-condenser, the oxidation column and to the bottom of the absorption column, conduits for passing nitric acid from the refrigerator-condenser and the oxidation column to intermediate elevation of the absorption column, and from the bottom of the absorption-oxidation column to the bleaching column, a conduit to pass air to the bleaching column and a conduit to pass gases from the bleaching column to the oxidation column.

4. The aparatus according to claim 1 in which there is a water line having a loaded valve for introducing water into the top of the absorption-oxidation column.

References Cited

UNITED STATES PATENTS

| | | | |
|---|---|---|---|
| 1,328,259 | 1/1920 | Barbet | 261—148X |
| 2,752,229 | 6/1956 | Brown et al. | 261—114X |
| 2,942,953 | 6/1960 | Shields | 23—260 |
| 3,441,380 | 4/1969 | Morrow | 23—260 |

JAMES H. TAYMAN, Jr., Primary Examiner

U.S. Cl. X.R.

23—283, 162; 261—114, 148